US008134994B2

(12) United States Patent
Liu et al.

(10) Patent No.: US 8,134,994 B2
(45) Date of Patent: Mar. 13, 2012

(54) METHOD OF SCHEDULING ON DOWNLINK AND TRANSMITTING ON UPLINK DEDICATED CHANNELS

(75) Inventors: Jung-Tao Liu, Randolph, NJ (US); Wenfeng Zhang, Edison, NJ (US)

(73) Assignee: Alcatel Lucent, Paris (FR)

( * ) Notice: Subject to any disclaimer, the term of this patent is extended or adjusted under 35 U.S.C. 154(b) by 977 days.

(21) Appl. No.: 10/366,382

(22) Filed: Feb. 14, 2003

(65) Prior Publication Data
US 2004/0160936 A1 Aug. 19, 2004

(51) Int. Cl.
*H04B 7/212* (2006.01)
(52) U.S. Cl. ......... 370/348; 370/329; 370/341; 370/350
(58) Field of Classification Search .................. 370/330, 370/322, 329, 335, 348, 350, 341
See application file for complete search history.

(56) References Cited

U.S. PATENT DOCUMENTS

| | | | |
|---|---|---|---|
| 5,680,398 A | | 10/1997 | Robinson |
| 5,754,537 A * | | 5/1998 | Jamal ............................ 370/330 |
| 6,031,827 A * | | 2/2000 | Rikkinen et al. ............... 370/330 |
| 6,236,646 B1 * | | 5/2001 | Beming et al. ................. 370/335 |
| 6,269,088 B1 | | 7/2001 | Masui et al. |
| 6,532,225 B1 * | | 3/2003 | Chang et al. ................... 370/341 |
| 6,711,403 B1 | | 3/2004 | Herrmann et al. |
| 6,836,469 B1 * | | 12/2004 | Wu ................................ 370/322 |
| 7,042,856 B2 * | | 5/2006 | Walton et al. .................. 370/329 |
| 7,117,003 B2 * | | 10/2006 | Kayama et al. ................ 455/522 |
| 7,120,134 B2 * | | 10/2006 | Tiedemann et al. ........... 370/329 |
| 2003/0002464 A1 | | 1/2003 | Rezaiifar et al. |
| 2003/0076812 A1 * | | 4/2003 | Benedittis ...................... 370/350 |

FOREIGN PATENT DOCUMENTS

| | | |
|---|---|---|
| DE | 19911117 | 12/2000 |
| JP | 9055693 | 2/1997 |
| JP | 2000-232689 A | 8/2000 |
| WO | WO 2004/034656 A2 | 4/2004 |

OTHER PUBLICATIONS

3rd Generation Partnership Project; Technical Specification Group Radio Access Network; Physical channels and mapping of transport channels onto physical channels (FDD) (Release 5). 2002, 3GPP Organizational Partners.
"Digital cellular telecommunications system (Phase 2+); General Packet Radio Service (GPRS); Overall description of the GPRS radio interface; Stage 2; (GSM 03.64 version 7.0.0 Release 1998)". European Telecommunication Standard, XX, XX, Jul. 1999, pp. 1-42.

(Continued)

*Primary Examiner* — Hassan Kizou
*Assistant Examiner* — Toan D Nguyen
(74) *Attorney, Agent, or Firm* — Harness, Dickey & Pierce, P.L.C.

(57) ABSTRACT

In the scheduling method of the present invention, scheduling grant messages for a user equipment are transmitted beginning in any time slot of a frame for a channel so long as the scheduling grant message does not exceed the frame. The scheduling grant message indicates user equipment is approved to transmit on an uplink dedicated channel. This downlink transmission and subsequent uplink dedicated channel transmission have a timing relationship such that no more than one user equipment will begin transmitting on a respective uplink dedicated channel at a time.

37 Claims, 3 Drawing Sheets

OTHER PUBLICATIONS

"Uplink Enhancements for dedicated transport channels." XP002258819N1 #29. http://www.3gpp.org/ftp/tsg_ran/WG1_RLT/TSGR1_29/Docs/Zips/; retrieved Oct. 22, 2003.

"Universal Mobile Telecommunications System (UMTS); Physical Channels and Mapping of Transport Channels onto Physical Channels (FDD)." ETSI TS 123 211 V3.1.1, XX, XX, Nov. 2, 2000, pp. 1-38.

European Search Report, dated Dec. 3, 2003.

XP002257815—*Bluetooth Specification* Version 1.1, Jun. 5, 2003, pp. 43-47.

3GPP2-TSG-C30-20030113-xxx, A Time Scalable Priority-Based Scheduler for IS-2000 Release C Reverse Link Baseline Simulations, pp. 1-9, Jan. 13, 2002.

Office Action for Japanese Application No. 2003-295914 dated Oct. 30, 2008 and English Translation.

Japanese Office Action (Refusal Decision) with English translation dated Mar. 29, 2010 for Japanese Application No. 2003-295914.

Korean Office Action with English translation dated Apr. 30, 2010 for Korean Application No. 10-2003-0057887.

* cited by examiner

FIG. 3

| Control 1 | Data 1 | Data 2 | Data 3 | Control 2 | Control 2 |

METHOD OF SCHEDULING ON DOWNLINK AND TRANSMITTING ON UPLINK DEDICATED CHANNELS

BACKGROUND OF THE INVENTION

The present invention relates to wireless communications systems, and is particularly applicable to third generation wireless communication systems such as UMTS. At least one wireless standards body is investigating the use of a transport channel dedicated to high speed data transmissions on the uplink (i.e., between user equipment and the wireless network). In UMTS this uplink high speed dedicated transport channel has become known as the enhanced uplink dedicated channel (EUDCH). The desired result of investigating the use of channels such as EUDCH is an efficient transfer of data from user equipments (UEs) to the network.

SUMMARY OF THE INVENTION

As described in detail below, the present invention can provide, among other things, a method for scheduling uplink transmissions on high speed data dedicated channels, such as the EUDCH in UMTS discussed in the Background of the Invention section. Additionally, the scheduling method can provide a timing structure between downlink scheduling messages and the responsive uplink transmissions such that data transfer is performed in an efficient manner.

In a first embodiment of the present invention, existing downlink and uplink dedicated physical channels are used. However, a timing relationship for sending scheduling grant messages and responding to the scheduling grant messages is defined. In sending scheduling grant messages, a scheduling grant message is sent beginning in any time slot of a frame for a downlink dedicated physical channel such that the scheduling grant message does not exceed the frame. In transmitting, in response to the scheduling grant message, the transmission on the uplink dedicated channel occurs after processing the scheduling grant message in one embodiment or after a predetermined period of time in another embodiment. In the other embodiment, the predetermined period of time is set in relation to the time needed to process scheduling grant messages.

In a second embodiment of the present invention, a shared control channel is used to send scheduling grant messages, and a newly defined enhanced uplink dedicated physical data channel (EUDPDCH) is used by respective user equipment in responding. In transmitting over the EUDPDCH, the transmission on the uplink dedicated channel occurs after processing the scheduling grant message in one embodiment or after a predetermined period of time in another embodiment. In a further embodiment, the transmission on the EUDPDCH occurs at an (m×256 chip) time point (where m=0 to 149) measured from a beginning of a frame of the EUDPDCH equal to or greater than a period of time following receipt of the scheduling grant message.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 3 illustrates a possible way to time multiplex the uplink transmission.

DETAILED DESCRIPTION OF EMBODIMENTS

Figure 1:
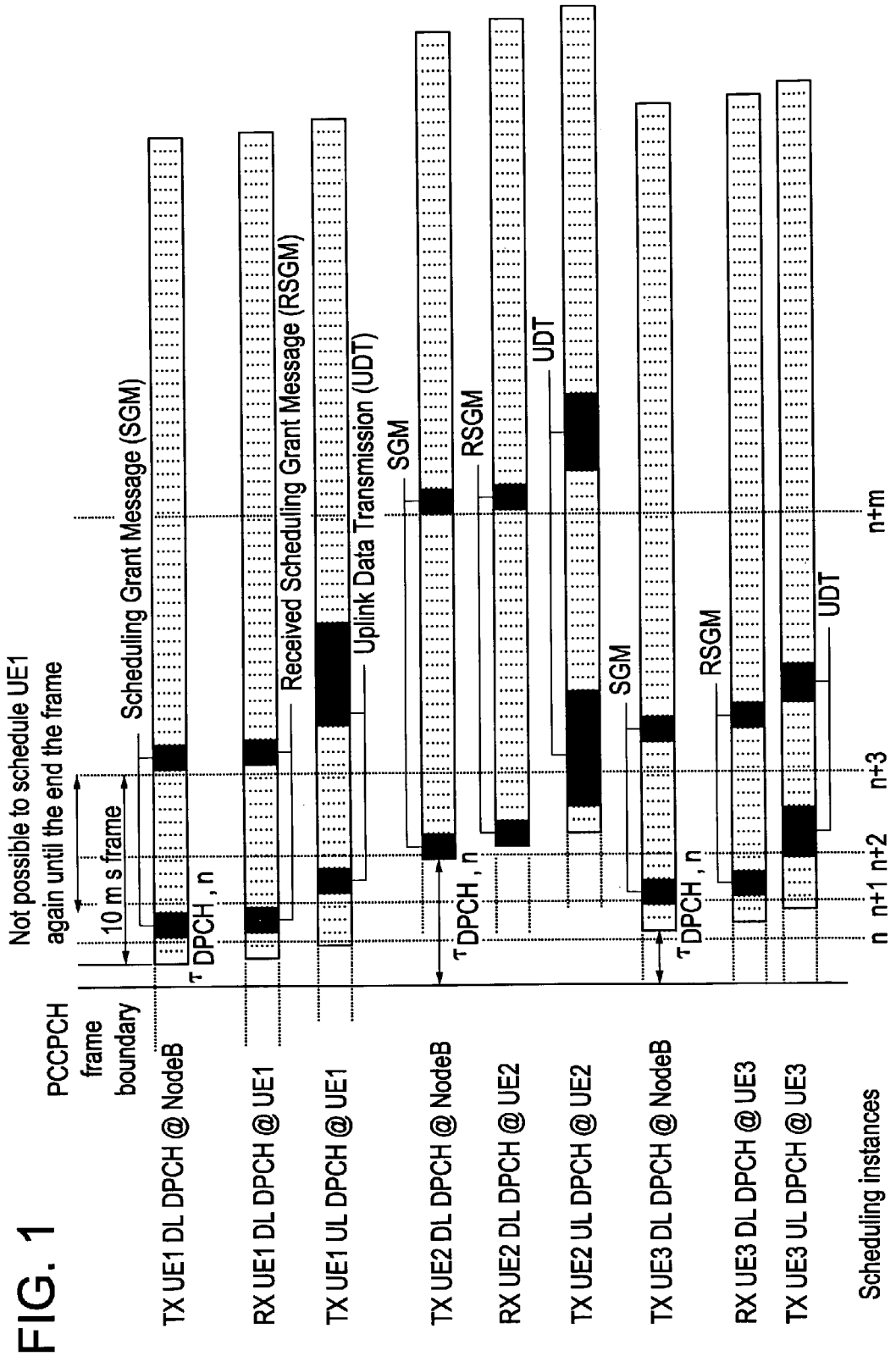
FIG. 1 illustrates an example of the timing between the downlink signaling and uplink dedicated physical channel transmission according the first embodiment of the present invention.

As described in detail below, the present invention can provide, among other things, a method for scheduling uplink transmissions on high speed data dedicated channels, such as the EUDCH in UMTS discussed in the Background of the Invention section. Additionally, the scheduling method can provide a timing structure between downlink scheduling messages and the responsive uplink transmissions such that data transfer is performed in an efficient manner. A first embodiment of the present invention described below, applies the principles of the present invention to a currently proposed wireless communication system transport and physical channel architecture. A second embodiment of the present invention described below, applies the principles of the present invention by modifying the currently proposed wireless communication system transport and physical channel architecture. These embodiments therefore demonstrate the applicability of the present invention to a wide range of wireless communication systems.

First Embodiment

In current third generation wireless communication systems, transmission of downlink channels such as downlink dedicated physical channels transmitted from, for example, a base station (also referred to as a "Node B") to user equipment (e.g., a mobile station) are synchronized with respect to a certain reference clock. For example, in a currently proposed third generation wireless communication systems (e.g., Rel99/4/5 of UMTS), the downlink dedicated physical channel (DPCH) timings are $\tau_{DPCH,n}=T_n \times 256$ chips, $T_n \in \{0,1,\ldots,149\}$ offset from the P-CCPCH (primary common control physical channel) frame timing. This means the downlink DPCH can start at any time relative to the P-CCPCH frame boundary as long as it is an integer multiple of 256 chips. However, the transmission on the downlink dedicated channel must start at the beginning of the frame.

The user equipment (UE) starts an uplink transmission on an uplink dedicated channel whenever there is data to transmit from the UE. However, this transmission starts at the beginning of a frame of the uplink dedicated channel. In UMTS, the timing for the beginning of a frame in the uplink dedicated physical control channel (DPCCH) and dedicated physical data channel (DPDCH) transmissions starts roughly $T_o=1024$ chips after the reception of the first detected path (in time) of the corresponding downlink DPCH frame. The timing of the frame is not exactly 1024 chips since the propagation delay is different to from UE to UE. However, the difference in propagation delay is usually within a few chips. The time period To generally represents the processing time required for the UE to process the downlink channel. The uplink DPCCH/DPDCH timing is, therefore, restricted by the timing of the downlink DPCH.

In structuring an efficient method of transmitting data over a high speed dedicated channel such as EUDCH under the restriction that no new physical channels are to be created, the uplink (UL) and downlink (DL) DPDCHs/DPCCHs (collectively referred to as dedicated physical channels (DPCHs)) are used in the present embodiment to carry, for example, the EUDCH and its related control information in both directions. The detailed aspects of this embodiment of the present invention will now be described for transmitting the EUDCH in a UMTS wireless communication system.

According to this embodiment, the EUDCH and the associated downlink signalling over the DPCHs is accomplished by defining a new radio configuration for EUDCH both for the DL and the UL. The new configuration will indicate that DPCHs are being used for EUDCH but no transport format or transmission information are stipulated to the configuration. No such information needs to be specified as it will be indicated on the fly through the EUDCH signalling. To maximise flexibility in scheduling uplink transmissions of the EUDCH, and therefore, more efficiently schedule EUDCH transmission by different UEs, the Node B transmits scheduling grant messages to trigger uplink transmissions by the UEs. The scheduling grant message can be as simple as a bit indicating whether the UE is scheduled or not. However, it will be appreciated that more complex forms of scheduling are possible where coding and modulation, data rate and hybrid ARQ information are transmitted as well. The complexity of the scheduling grant message will be determined by the system designer. The transmission of a scheduling grant message on the DL DPCH can occur at any slot within the frame of the DL DPDCH so long as the scheduling grant message does not exceed the frame. However, only one scheduling grant message is allowed per frame of a DPCH. This is due to the fact the DPCH is decoded at a minimum of 10 ms in Rel99/4/5 of UMTS. Given this flexibility, the wireless network can control the transmission of scheduling grant messages to help prevent two or more UEs beginning transmission at substantially the same time by transmitting non-overlapping scheduling grant messages for the UEs.

In this embodiment, it is assumed that no voice is being transmitted over the DPCH carrying the EUDCH and that the in-band signalling carried over the DPCH has priority over the DL EUDCH control signalling.

That uplink transmissions of the EUDCH on the DPCH do not begin at substantially the same time is ensured by establishing a fixed timing relationship at the UEs between receipt of the scheduling grant message and transmission on the uplink DPCH. In one exemplary embodiment, the period of time between receipt of the scheduling grant message and subsequent transmission on the uplink DPCH is fixed at a value at least equal to or greater than a worst case time to process a scheduling grant message at the UEs. However, this time period can be fixed at other possible values such as an expected average time for processing scheduling grant messages. Because the scheduling grant messages are sent in a non-overlapping manner, the use of this fixed timing relationship in the transmission over the uplink DPCH prevents more than one UE from beginning an uplink transmission on a DPCH. Accordingly, interference between UE uplink transmissions is reduced.

Furthermore, because the scheduling grant messages can be sent at any time slot within the frame, the UEs performs blind detection to determine over which time slot the scheduling grant message is transmitted. In one exemplary embodiment, the length of a scheduling grant message is not fixed. As a result, the blind detection operation detects the beginning and length of the scheduling grant message. However, in another exemplary embodiment, the length or duration of the scheduling grant message is fixed. As a result, only blind detection of the beginning of the scheduling grant message is required.

FIG. 1 illustrates an example of the timing between the downlink signaling and uplink dedicated physical channel according the first embodiment of the present invention. As shown in FIG. 1, the maximum flexibility of the scheduling is obtained by allowing UEs to decode the control information over the DPCH before the 10 ms frame is over. Uplink transmission starts right after or a predetermined period of time after the decoding of the downlink signaling, which indicates the uplink transport format, transmission time interval, etc. Early decoding of the control information is assumed feasible by adding a new radio configuration to indicate that the current DPCH is to be used for EUDCH signaling, and blind detection is carried out to determine which time slots the signaling is transmitted.

In FIG. 1, the scheduling grant message for UE1 is sent on the downlink using the $3^{rd}$ and $4^{th}$ slot in the downlink DPCH for UE1, (two time slots are used merely as an example length for the scheduling grant message). The transmission over the UL DPDCH takes three time slots. After the transmission, no scheduling grant message can be sent until the next 10 ms frame boundary. This inefficiency can be compensated for if different transmission time intervals are allowed for different packets. For example, in FIG. 1, UE2 is scheduled to transmit using 9 time slots, which reduces the number of unused time slots in one 10 ms radio frame. One other question that could affect performance is whether to allow one transmission to cross the frame boundary when the scheduling was sent near the end of the 10 ms frame. In FIG. 1, the $2^{nd}$ scheduling grant, which is for UE2, illustrates this scenario. When UE2 receives its downlink signaling, it has only 3 time slots left in the uplink DPCH. However, based on the buffer backlog, UE available power, path loss information, etc, the scheduler at Node B may want to schedule the transmission for more than 3 time slots. Accordingly, UE2 transmits for the last three time slots of the current frame and next six time slots of the next frame. On the downlink, transmissions across the 10 ms frame boundary are possible, if both the transmission time interval and the transmission start time are known at the Node B. In an exemplary embodiment, the Node B in this case tracks the $\tau_{DPCH,n} = T_n \times 256$ chips, $T_n \in \{0,1,\ldots,149\}$ in order to schedule at the right instance and to avoid too many UE transmissions overlapping at the same time. A $3^{rd}$ scheduling of a third UE3 is also depicted.

It will be appreciated the scheduler at the Node B has the flexibility to trigger uplink transmissions of, for example, EUDCHs of different UEs that would permit the most efficient transfer of data. Namely, by scheduling UE2 as shown in FIG. 1, a longer transmission at higher data rates may be made possible by this flexibility in scheduling.

Second Embodiment

In a second embodiment of the present invention, a downlink control channel like the high speed—shared control channel (HS-SCCH) in UMTS is used to send the scheduling grant messages to the UEs, and a new physical data channel, called enhanced uplink dedicated physical data channel (EUDPDCH), is established for responsive transmission on the uplink. This structure provides even greater flexibility, and therefore, an increased possibility of transmission efficiencies.

A Node B uses the HS-SCCH like shared control channel to send the scheduling grant messages. The transmission time interval (TTI) for a scheduling grant message can be fixed in one exemplary embodiment or left flexible in another. Unlike the first embodiment where a scheduling grant message for a particular UE was sent over a dedicated channel, this embodiment uses a shared channel for sending scheduling grant messages. Accordingly, scheduling grant messages for more than one UE can be sent over a single downlink channel, and fewer channels may be needed to send the scheduling grant messages. This structure also ensures that no overlap between scheduling grant messages will occur, and permits more than one scheduling grant message to be sent in one frame of the downlink channel. Also, the scheduling grant messages include identification information, as is well-known with shared channels such as HS-SCCH, identifying to which UE the scheduling grant message is intended.

In this embodiment, the UEs monitor the shared control channel for scheduling grant messages with their respective identification information. As in the first embodiment, blind detection of the beginning of scheduling grant messages is performed, and the duration or length of the scheduling grant message is also blindly detected when the TTI of the scheduling grant messages is not fixed.

When a UE receives a scheduling grant message intended for that UE, the UE transmits over the uplink EUDPDCH. In one exemplary embodiment, the transmission on the EUDPDCH is performed based on a fixed timing associated with receipt of the scheduling grant message. In one exemplary embodiment, the period of time between receipt of the scheduling grant message and subsequent transmission on the EUDPDCH is fixed at a value at least equal to or greater than a worst case time to process a scheduling grant message at the UEs. However, this time period can be fixed at other possible values such as an expected average time for processing scheduling grant messages. Because the scheduling grant messages are sent in a non-overlapping manner, the use of this fixed timing relationship in the transmission over the uplink DPCH prevents more than one UE from beginning an uplink transmission on a DPCH.

In another exemplary embodiment, the transmission on the EUDPDCH is based on a fixed timing relationship associated with receipt of the scheduling grant message and a frame timing of the EUDPDCH. In this exemplary embodiment, transmission on the EUDPDCH in response to a scheduling grant message occurs at an (m×256 chip) time point (where m=0 to 149) measured from a beginning of a frame of the EUDPDCH equal to or greater than a period of time following receipt of the scheduling grant message. In an exemplary embodiment, this period of time from receipt of the scheduling grant message is the time required to process the scheduling grant message. In another embodiment, this period of time is fixed at a value at least equal to or greater than a worst case time to process a scheduling grant message at the UEs. However, this time period can be fixed at other possible values such as an expected average time for processing scheduling grant messages. Also, instead of being based on a 256 chip interval, the timing relationship with respect to the beginning of a EUDPDCH frame can be based on another chip interval. Because the scheduling grant messages are sent in a non-overlapping manner, the use of this fixed timing relationship in the transmission over the EUDPDCH prevents more than one UE from beginning an uplink transmission on their EUDPDCH at a same time.

Figure 2:
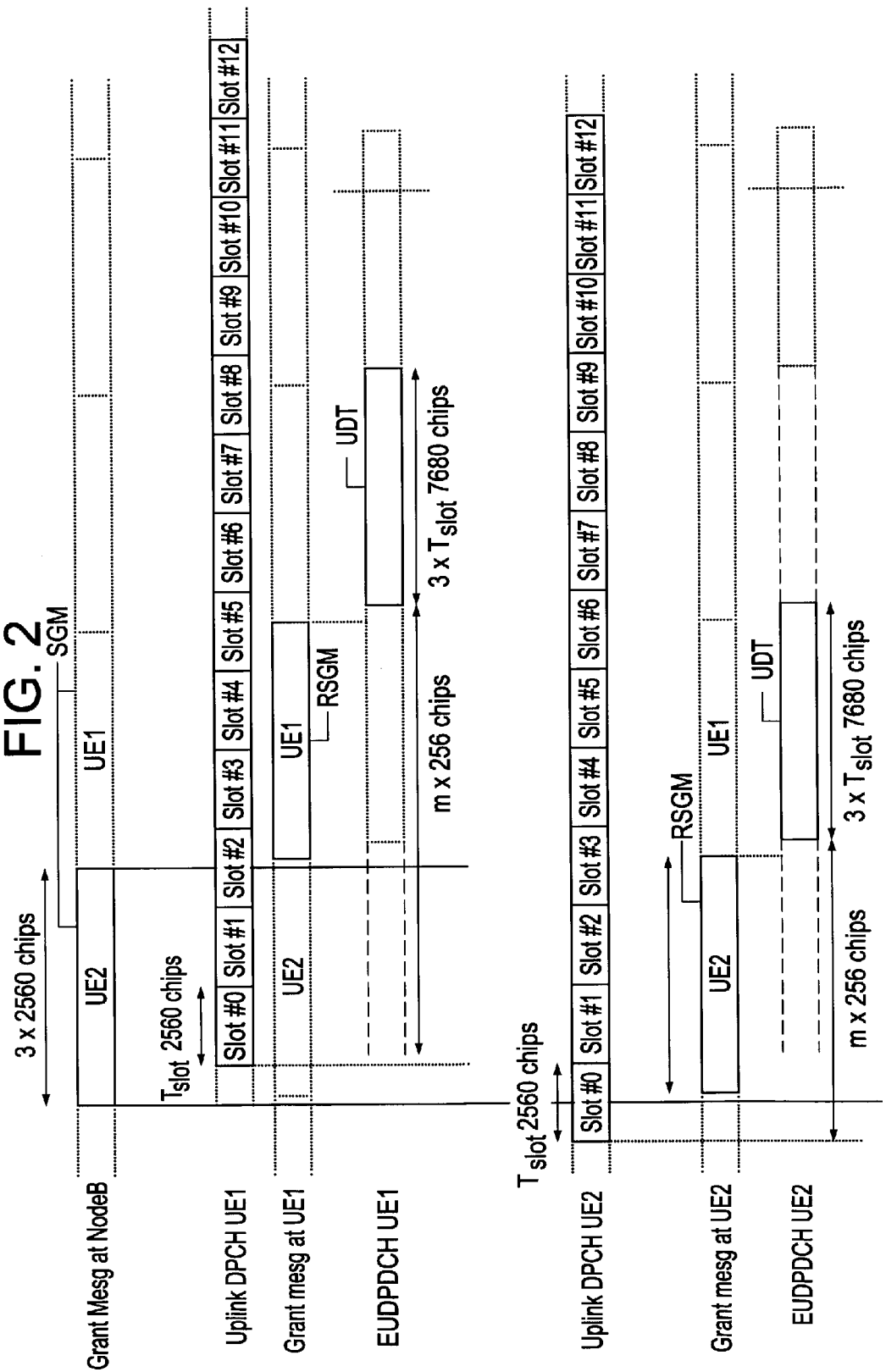
FIG. 2 illustrates an example of the timing between the downlink signaling and uplink dedicated physical channel transmission according the second embodiment of the present invention.

FIG. 2 gives an example of the timing between the downlink signalling on the HS-SCCH like control channel and the EUDPDCH transmissions. As shown in FIG. 2, the TTI of the scheduling grant messages in this example is fixed at three slots (i.e., 3×2560 chips in UMTS). Assuming that transmissions use a fixed TTI value, UE transmission starts a predetermined time period (e.g., To=1024 chips)+possibly some offset (to make sure that transmissions over the EUDPDCH are synchronous to multiples of 256 chips from the beginning of the EUDPDCH frame) after it receives the scheduling grant on the downlink SCCH like control channel. On the uplink, the Node B receives transmissions from different UEs in an orderly manner, but slightly out of sync due to propagation delays.

Furthermore, the uplink control channel of the UE can be 1 slot ahead of the EUDPDCH and not overlapping with the EUDPDCH. In this case, uplink control signaling can share the same channelization code with the EUDPDCH; this is not necessarily to allow more efficient usage of the channelization code but to help reduce the peak-to-average ratio (PAR) to the input of the UE's amplifier. To make it more clear, assuming there are 3 time slots of uplink control information, and 3 time slots of EUDPDCH, the Node B would expect the uplink transmission roughly (To+Offset) seconds after sending the scheduling grant.

FIG. 3 shows a possible way to time multiplex the uplink transmission. Control slots C1, C2 and C3 can be in any position depending on how critical the control information in that slot is. In the case of UE rate determination, a system designer may want to put TFCI (transport format control indicator) in C1, and buffer backlog, power margin, etc, in C2 and C3. Or if in the case of Node B rate determination, one can simply put all control information after the data. However, it is beneficial not to transmit the control and data at the same time to reduce the PAR.

The invention being thus described, it will be obvious that the same may be varied in many ways. Such variations are not to be regarded as a departure from the spirit and scope of the invention, and all such modifications are intended to be included within the scope of the present invention.

We claim:

1. A method for scheduling uplink dedicated channels at a wireless network, comprising:
   transmitting, from a network node, a scheduling grant message to trigger uplink transmissions, the scheduling grant message starting in any time slot of a frame for a downlink channel, the scheduling grant message not exceeding the length of the frame, the scheduling grant message starting time slot capable of varying from frame to frame, and
   conducting a blind detection to determine the starting time slot of the scheduling grant message.

2. The method of claim 1, wherein the transmitting step transmits the scheduling grant message on a downlink dedicated physical channel.

3. The method of claim 2, wherein the transmitting step transmits one scheduling grant message per frame of the downlink dedicated physical channel at most.

4. The method of claim 1, wherein the transmitting step includes transmitting scheduling grant messages for more than one user equipment over downlink respective channels such that the transmissions of the scheduling grant messages do not overlap in time.

5. The method of claim 4, wherein the transmitting step transmits the scheduling grant message for each user equipment on a downlink dedicated physical channel associated with that user equipment.

6. The method of claim 5, wherein the transmitting step transmits, at most, one scheduling grant message per frame of each downlink dedicated physical channel.

7. The method of clam 1, wherein the downlink channel is a shared channel.

8. The method of claim 7, wherein the transmitting step transmits scheduling grant messages for more than one user equipment over the shared channel.

9. The method of claim 7, wherein the transmitting step transmits more than one scheduling grant message in the frame of the shared channel.

10. The method of claim 7, wherein the scheduling grant message has a fixed duration.

11. The method of claim 1, wherein the scheduling grant message schedules transmission of high speed data on an uplink dedicated physical channel.

12. The method of claim 1, wherein the scheduling grant message includes a bit indicating that the uplink transmissions are scheduled.

13. A method for scheduling uplink dedicated channels at a wireless network, comprising:
 transmitting, from a network node, at least one scheduling grant message over a downlink shared channel to trigger uplink transmission, the scheduling grant message starting in any time slot of a frame for the downlink shared channel, the scheduling grant message not exceeding the length of the frame, the scheduling grant message starting time slot capable of varying from frame to frame, and
 conducting a blind detection to determine the starting time slot of the scheduling grant message.

14. The method of claim 13, wherein the transmitting step transmits scheduling grant messages for more than one user equipment over the downlink shared channel.

15. The method of claim 13, wherein the transmitting step transmits more than one scheduling grant message in the frame of the downlink shared channel.

16. The method of claim 13, wherein the scheduling grant message has a fixed duration.

17. The method of claim 13, wherein the scheduling grant message schedules transmission of high speed data on an uplink dedicated physical channel.

18. A method for scheduling uplink dedicated channels at a wireless network, comprising:
 transmitting, from a network node, scheduling grant messages such that no more than one user equipment will begin transmitting on a respective uplink dedicated channel at a time, the scheduling grant message starting in any time slot of a frame for a downlink channel, the scheduling grant message not exceeding the length of the frame, the scheduling grant message starting time slot capable of varying from frame to frame, and
 conducting a blind detection to determine the starting time slot of the scheduling grant message.

19. The method of claim 18, wherein the scheduling grant messages schedule transmissions of high speed data on uplink dedicated physical channels.

20. A method of transmitting on an uplink dedicated channel from a user equipment, comprising:
 detecting a scheduling grant message transmitted starting in any time slot of a frame for a downlink channel, the scheduling grant message not exceeding the length of the frame, the scheduling grant message starting time slot capable of varying from frame to frame, and
 transmitting on the uplink dedicated channel in response to the detected scheduling grant message,
 wherein the detecting of the scheduling grant message includes conducting a blind detection to determine the starting time slot of the scheduling grant message.

21. The method of claim 20, wherein the transmitting step transmits on the uplink dedicated channel a predetermined period of time after an end of the scheduling grant message.

22. The method of claim 21, wherein the predetermined period of time is at least equal to a time period for the user equipment to process the scheduling grant message.

23. The method of claim 20, wherein the transmitting step transmits data on the uplink dedicated channel.

24. The method of claim 20, wherein the length of the scheduling grant message is not fixed, the detecting of the scheduling grant message further comprising:
 conducting a further blind detection to determine a length of the scheduling grant message.

25. The method of claim 20, wherein the scheduling grant message includes a bit indicating that the uplink transmissions are scheduled.

26. A method of transmitting on an uplink dedicated channel from a user equipment, comprising:
 transmitting, from a network node, on the uplink dedicated channel a predetermined period of time after an end of a received scheduling grant message, the received scheduling grant message starting in any time slot of a frame for a downlink channel and not exceeding the length of the frame, the scheduling grant message starting time slot capable of varying from frame to frame, and
 conducting a blind detection to determine the starting time slot of the scheduling grant message.

27. The method of claim 26, wherein the predetermined period of time is at least equal to a time period for the user equipment to process the scheduling grant message.

28. The method of claim 26, wherein the transmitting step transmits data on the uplink dedicated channel.

29. A method of transmitting on an uplink dedicated channel from a user equipment, comprising:
 transmitting, from a network node, on the uplink dedicated channel at a point in time synchronized to a beginning of a frame of the uplink dedicated channel in response to a received scheduling grant message, the received scheduling grant message starting in any time slot of a frame for a downlink channel and not exceeding the length of the frame, the scheduling grant message starting time slot capable of varying from frame to frame, and
 conducting a blind detection to determine the starting time slot of the scheduling grant message.

30. The method of claim 29, wherein the point in time synchronized to the beginning of the frame of the uplink dedicated channel is greater than or equal to a predetermined period of time after an end of the received scheduling grant message.

31. The method of claim 30, wherein the predetermined period of time is at least equal to a time period for the user equipment to process the scheduling grant message.

32. The method of claim 29, wherein the point in time synchronized to the beginning of the frame of the uplink dedicated channel is an integer multiple of a predetermined period of time from the beginning of the frame of the uplink dedicated channel.

33. The method of claim 29, wherein the predetermined period of time is predetermined number of chips.

34. The method of claim 33, wherein the predetermined number of chips is 256.

35. The method of claim 33, wherein the predetermined number of chips is an integer fraction of a slot of the frame of the uplink dedicated channel.

36. The method of claim 29, wherein the predetermined period of time is a slot of the frame of the uplink dedicated channel.

37. The method of claim 29, wherein the transmitting step transmits data on the uplink dedicated channel.

* * * * *